Sept. 23, 1958 R. L. BEYERSTEDT 2,853,200
TRACTOR SHOVEL

Filed Oct. 26, 1955 6 Sheets-Sheet 1

INVENTOR.
Ralph L. Beyerstedt
BY
Paul O. Pipper
Atty.

Sept. 23, 1958 R. L. BEYERSTEDT 2,853,200
TRACTOR SHOVEL
Filed Oct. 26, 1955 6 Sheets-Sheet 2

INVENTOR.
Ralph L. Beyerstedt
BY
Paul O. Pippel
Atty.

Sept. 23, 1958 R. L. BEYERSTEDT 2,853,200
TRACTOR SHOVEL
Filed Oct. 26, 1955 6 Sheets-Sheet 5
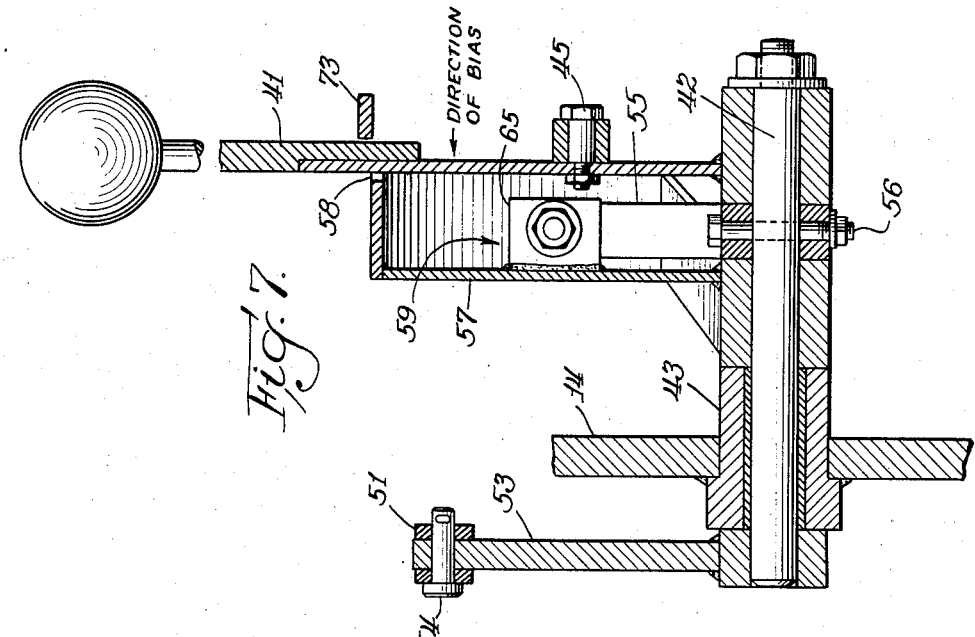
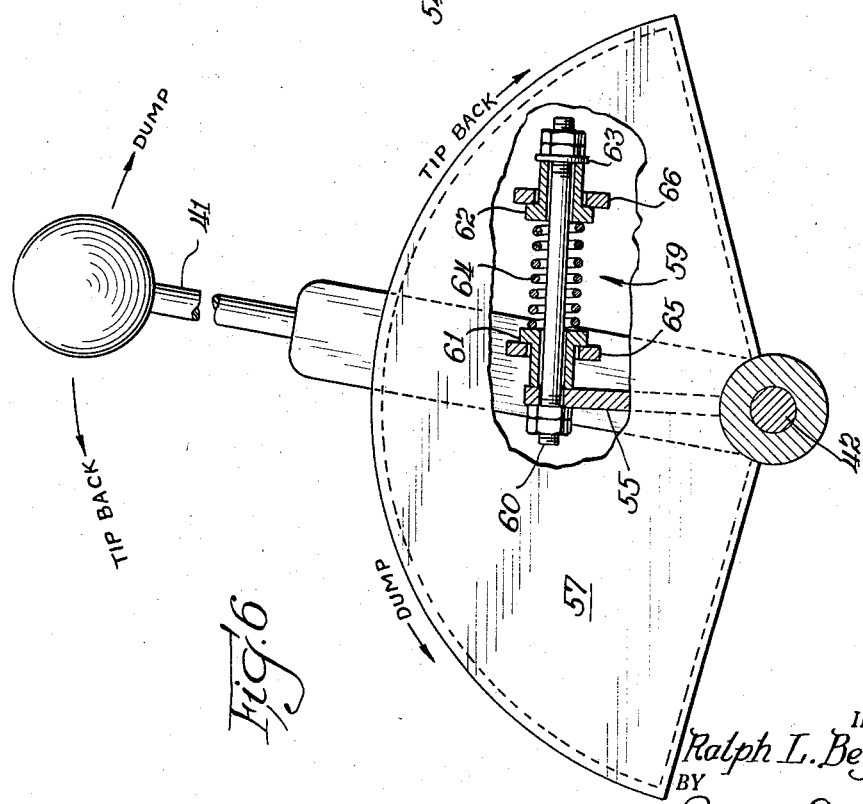
INVENTOR.
Ralph L. Beyerstedt
BY
Paul O. Pippel
Atty.

Sept. 23, 1958 R. L. BEYERSTEDT 2,853,200
TRACTOR SHOVEL
Filed Oct. 26, 1955 6 Sheets-Sheet 6

INVENTOR.
Ralph L. Beyerstedt
BY
Paul O. Pippel
Atty.

United States Patent Office 2,853,200
Patented Sept. 23, 1958

2,853,200
TRACTOR SHOVEL

Ralph L. Beyerstedt, Libertyville, Ill., assignor to The Frank G. Hough Co., a corporation of Illinois Application October 26, 1955, Serial No. 542,872

5 Claims. (Cl. 214—140)

This invention relates generally to tractor shovels, and more specifically to an improved arrangement for automatically indexing the shovel or bucket of a front end tractor loader.

Tractor shovels, as generally known in the art, comprise a tractor of either the rubber-tired or crawler type carrying a shovel or bucket at the front end thereof through a boom, with linkage means for controlling the position or tilt of the bucket relative to the boom. Further, a pair of hydraulic rams are generally provided for raising and lowering the boom to in turn raise and lower the bucket, and another pair of hydraulic rams may be provided for adjusting the linkages to tilt the bucket relative to the boom. These hydraulic rams are generally controlled by levers located in the operator's compartment, one lever being provided for controlling the boom raising rams, and another lever for controlling the linkage operating rams. In the operation of these tractor shovels it has been found that the degree to which any one pair of the rams should be operated when operating between the extreme positions of the ram, is a difficult one, and the operator of the tractor must oftentimes acquire a feel or familiarity of the controls to satisfactorily operate the loader.

It is the object of the present invention to provide an indexing arrangement for a tractor shovel where the bucket or shovel will be automatically indexed to a certain position relative to the boom after an initial tilting operation of the bucket.

It is a further object of the present invention to provide an indexing means for a tractor shovel which will index the bucket to the dig position relative to the boom at any position of boom travel.

It is another object of the present invention to provide indexing means for a hydraulic ram arrangement wherein the indexing is accomplished between the extreme positions of the ram.

Other objects and features of the present invention will be apparent upon a perusal of the following specification and drawings, of which:

Figure 6 is a partial cross sectional view of the structure shown in Figure 5 taken along the line 6—6 of Figure 5;

Figure 4:
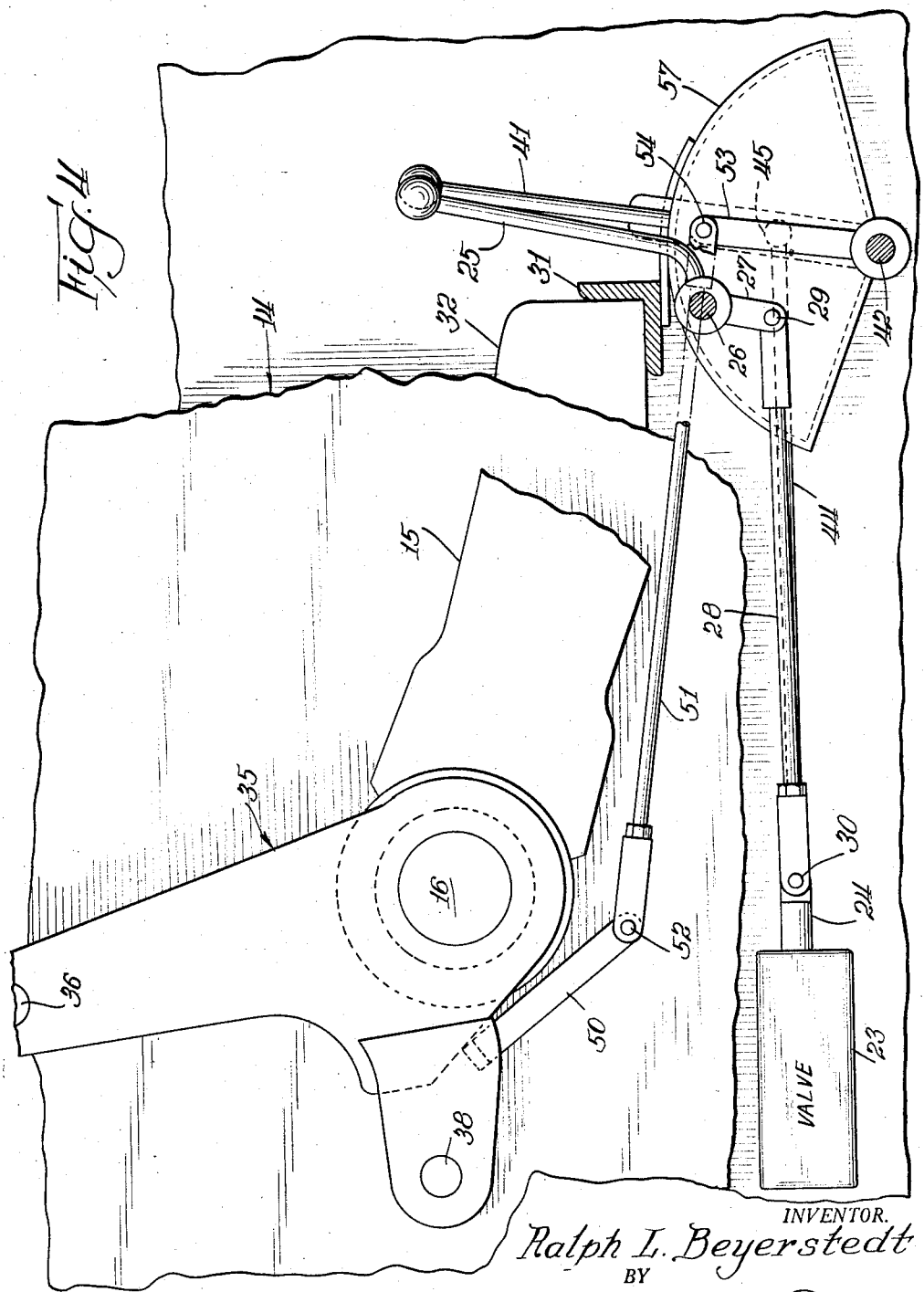
Figure 4 is a partial enlarged side plan view of the structure shown in Figure 2 with a number of elements omitted.
Figure 5:
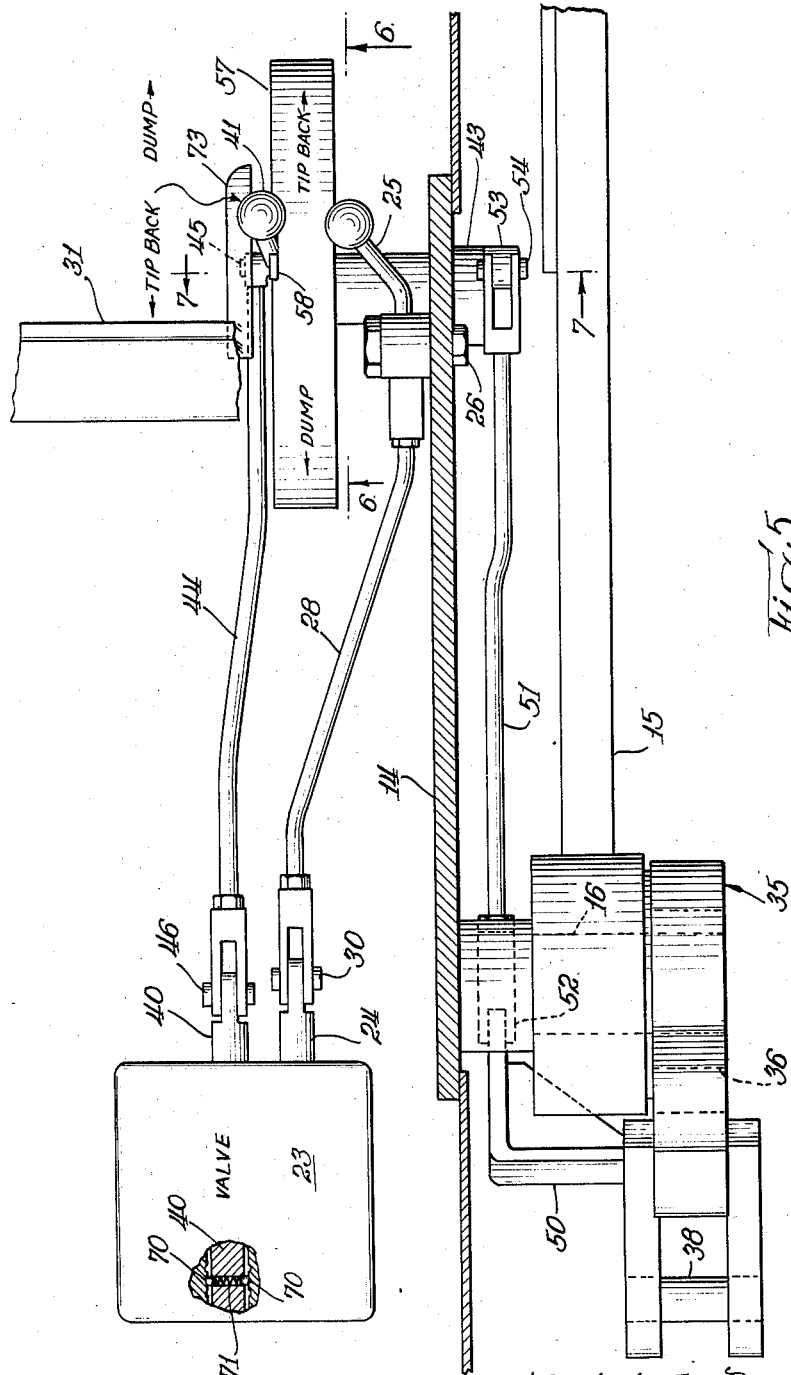
Figure 5 is a partial top plan view of the tractor loader with some elements omitted and with some portions thereof shown in cross section.
Figure 8:
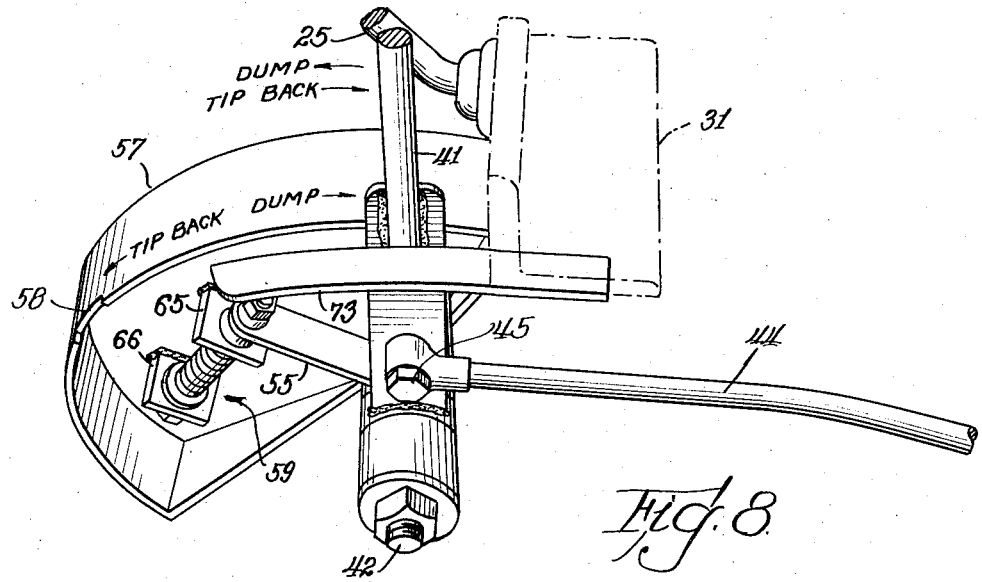
Figure 9:
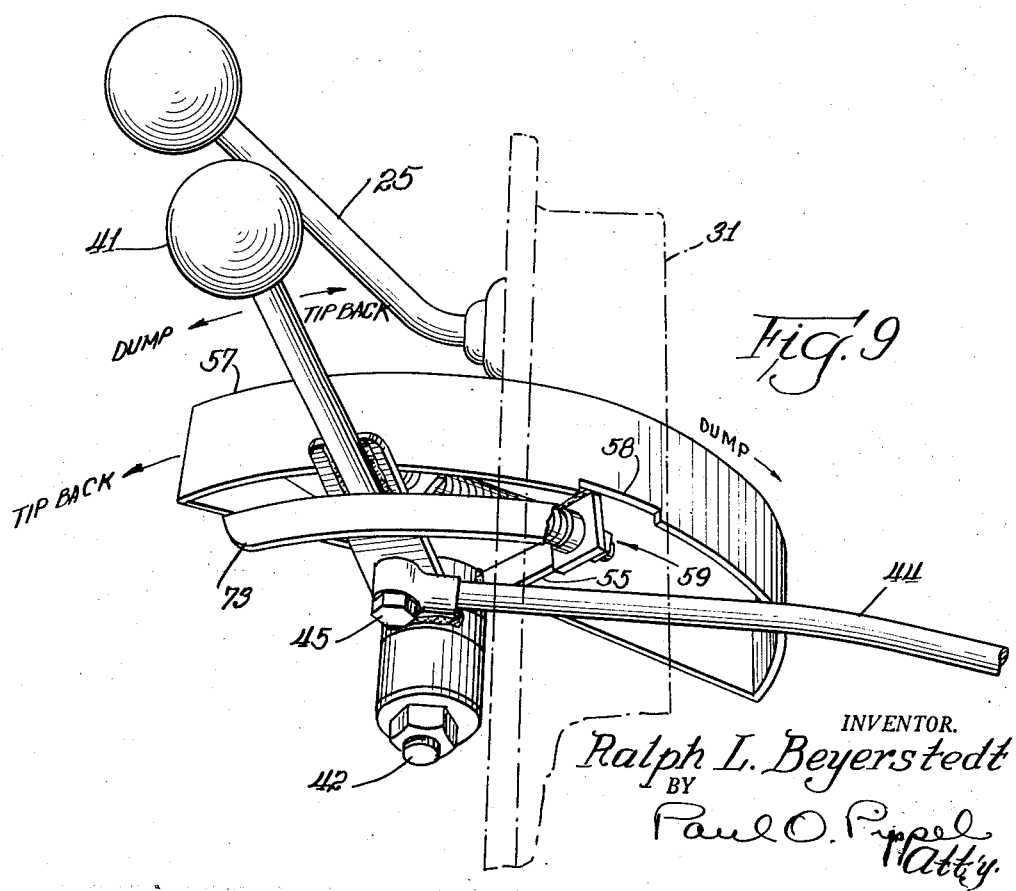

Figure 7 is a partial cross sectional view of the structure shown in Figure 5 taken along the line 7—7 of Figure 5; and Figures 8 and 9 are partial perspective views of the structure shown in Figures 4 and 5.

The present embodiment is the preferred embodiment but it is to be understood that changes can be made in the present embodiment by one skilled in the art without departing from the spirit and scope of the present invention.

For a detailed description of the present invention reference is made to the drawings. In the present embodiment a tractor 10 of the rubber-tired type is provided. The tractor 10 comprises a chassis supporting a rearwardly disposed engine compartment 11 and a forwardly disposed operator's compartment 12 with the chassis supported by the wheels 13. The side walls 14 of the operator's compartment support the shovel mechanism.

Figure 1:
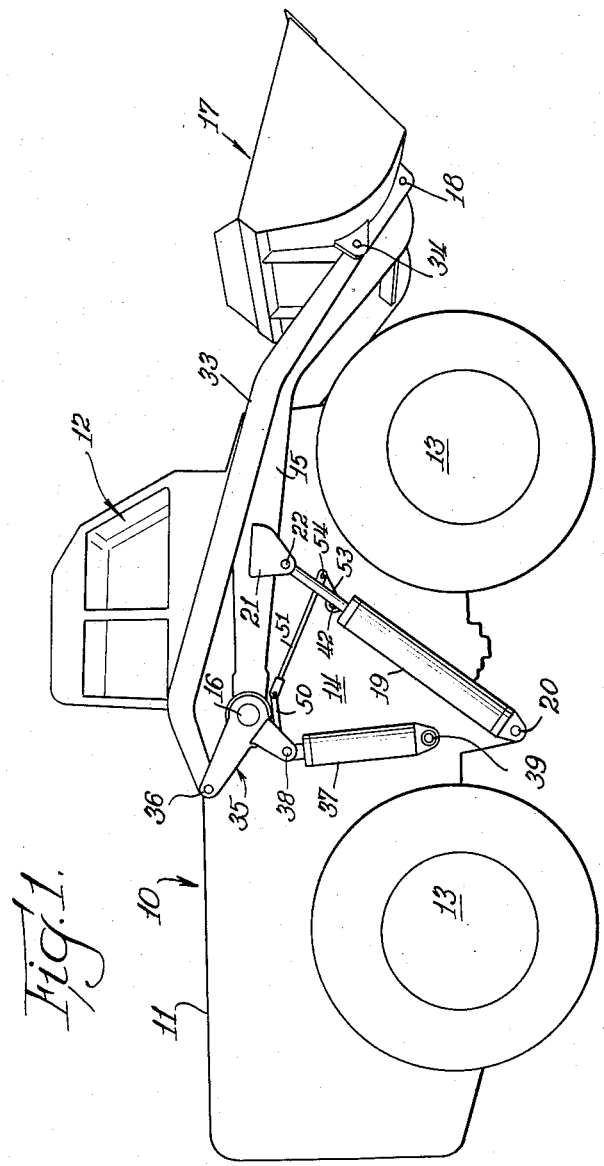
Figure 1 is a side elevational view of a tractor shovel constructed according to the present invention and with the bucket or shovel positioned in a normal carrying position.
Figure 2:
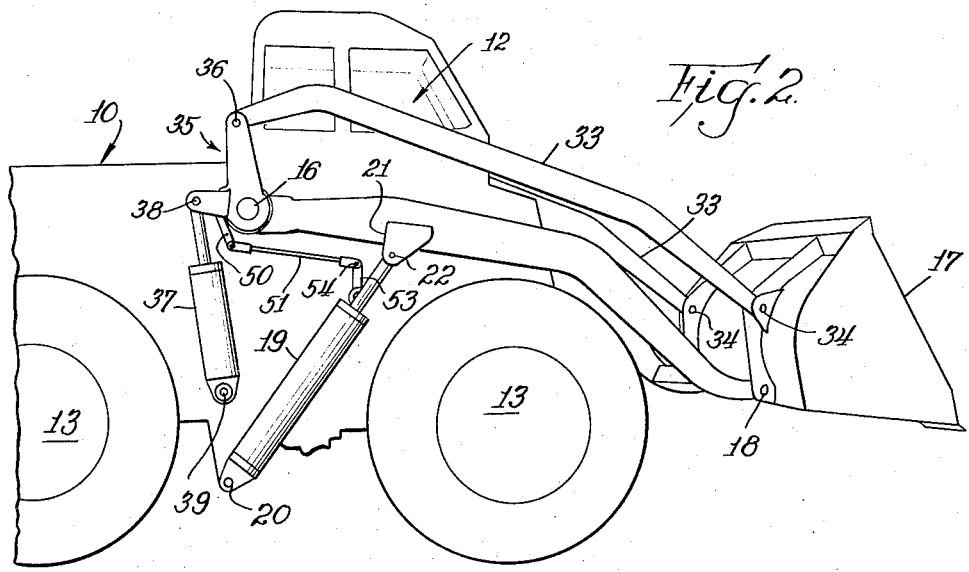
Figure 2 is a partial view of the structure shown in Figure 1 with the bucket indexed to the dig position and with the bucket raised some distance above the ground.
Figure 3:
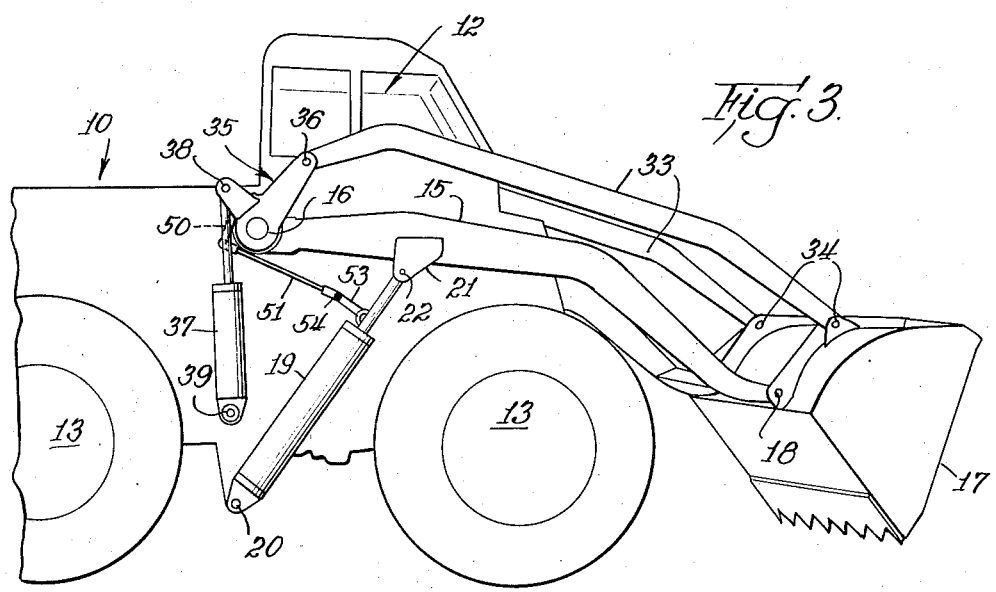
Figure 3 is a partial view of the structure shown in Figure 2 with the bucket tilted to the dump position.

The shovel mechanism comprises a boom 15 which is formed in duplicate portions disposed on each side of the tractor with the rear end of each portion of the boom 15 pivotally mounted about a pin 16 which is mounted to each side wall 14, as can be seen in Figure 5. The outer or forward end of each portion of the boom 15 is pivotally mounted to a bucket or shovel 17 through pivotal mounting means 18. To raise and lower the boom 15, a pair of hydraulic rams 19 are provided. The hydraulic rams 19 are disposed one on each side of the tractor 10 and are pivotally mounted at their head ends to the side walls 14 through pivotal mounting means 20. The rod ends of the hydraulic rams 19 are pivotally mounted to each portion of the boom 15 through a pair of brackets 21 and pivotal mounting means 22. The brackets 21 are secured to each portion of the boom 15 intermediate the ends thereof, as can be seen in Figures 1, 2 and 3.

To control the raising and lowering of the boom 15, a valve 23, which can be seen in Figures 4 and 5, is provided. The valve 23 which may be of any suitable type of hydraulic valve well known in the art essentially comprises two sections, one section for controlling operation of the boom 15, and another section for controlling operation of the linkage means to be described below. Hydraulic pump, conduit and reservoir means (not shown) interconnect the valve 23 and the hydraulic rams 19. The spool of the hydraulic valve 23 for controlling operation of the hydraulic rams 19 is designated with the numeral 24. The spool 24 is connected with an operating lever 25 mounted in the operator's compartment as can be seen in Figures 4 and 5. The lever 25 is pivotally mounted to the right side wall 14 of the operator's compartment 12 through pin means 26. The lever 25 comprises a lever arm 27 which is pivotally mounted to a link 28 through pivotal mounting means 29. The link 28 which is adjustable in length is pivotally mounted to the valve spool 24 of the valve 23 through pivotal mounting means 30, as can be seen in Figures 4 and 5. When the lever 25 is pivoted in a clockwise direction as shown in Figure 4, the valve spool 24 is moved to cause the hydraulic rams 19 to be contracted to lower the boom 15, and when the lever 25 is moved in a counterclockwise direction, as viewed in Figure 4, the valve spool 24 is moved to cause the hydraulic rams 19 to extend to raise the boom 15 and the bucket 17 carried thereby.

The member 31 seen in Figures 4 and 5 and in dotted lines in Figures 8 and 9 is a channel member mounted between the side walls 14 of the operator's compartment 12 and serves to support the forward edge of the seat 32 for the operator's compartment. The seat 32 is shown only in Figure 4.

The linkage means for controlling the tilt of the bucket 17 comprises a link 33 formed in duplicate portions disposed on each side of the tractor 10. The forward end of each portion of the link 33 is pivotally mounted to the bucket or shovel 17 through pivotal mounting means 34. Pivotal mounting means 34 is spaced from pivotal mounting means 18 previously described. The rearward end of each portion of the link 33 is pivotally mounted to one arm of a bell crank 35 through pivotal mounting means 36. Each of the bell cranks 35 is pivotally mounted about the previously described pins 16 outwardly from the pivotal mounting of the boom 15 thereto, as can be seen in Figure 5. For purposes of clarity the link 33 is not shown in Figures 4 and 5. Each of the arms of the bell cranks 35 which is connected to one of the links 33 is formed of such a length, relative to the distance between the pivotal mounting means 18 and 34, that a parallelogram is substantially formed by the link 33 and the boom 15, so that for any one rotative position of the bell crank 35, the bucket 17 is maintained in one position of tilt relative to the boom 15 as the boom 15 is raised and lowered. The other arm of each of the bell cranks 35 is formed as a clevis, and each of these arms is pivotally mounted to the rod end of a hydraulic ram 37 through pivotal mounting means 38. The hydraulic rams 37 are positioned one on each side of the tractor 10 and the head ends thereof are pivotally mounted to the side walls 14 of the tractor 10 through pivotal mounting means 39. For purposes of clarity the hydraulic rams 37 are not shown in Figures 4 and 5. Referring especially to Figures 1 through 3, it can be seen that if the hydraulic rams 37 are fully contracted the bell cranks 35 are in their maximum counterclockwise position as viewed in these figures and the link 33 is in a position causing the bucket to maintain a tipped back or carrying position as shown in Figure 1. If the hydraulic rams 37 are then extended a certain predetermined amount to that position shown in Figure 2, the bell cranks 35 will be pivoted a certain amount in the clockwise direction as viewed in these figures to move the link 33 to cause the bucket 17 to substantially assume the digging position as shown in Figure 2. Although only one digging position is shown, as in Figure 2, the boom 15 may be raised or lowered to dig at any other level. If the hydraulic rams 37 are fully extended to a position such as shown in Figure 3, the bell cranks 35 will be pivoted to their maximum clockwise direction as viewed in these figures and the link 33 will cause the bucket 17 to assume the dump position as shown in Figure 3. It should further be noted that although only one dump position is shown as in Figure 3, the bucket may be tilted to the dump position from any other position of the bucket above ground level.

To control operation of the hydraulic rams 37, the valve 23 is further provided with a valve spool 40 and adapted for use as a spring biased three position valve. A hydraulic fluid pump, conduits, and reservoir means (not shown) interconnect the valve 23 including the valve spool 40 with the hydraulic rams 37 so that any operation of the valve spool 40 causes a related operation of the hydraulic rams 37. The three positions of the valve 23 including the valve spool 40 are a first position wherein hydraulic fluid under pressure is delivered to one end of the hydraulic rams 37, an intermediate position wherein hydraulic fluid is prevented from leaving either end of the hydraulic rams 37, and a third position wherein hydraulic fluid under pressure is supplied to the other end of the hydraulic rams 37. As may be seen in the cutaway portion of the valve 23 in Figure 5, the valve body is provided with three sets of notches or detent slots. The spool 40 is provided with a transverse bore and a coiled spring 71 disposed within the bore. A pair of detent balls 70 positioned at each end of the spring 41 are biased by the spring 71 into engagement with the detent slots. The positions of the detent slots in the valve body correspond to three operated positions of the spool 40 and the noted three spring biased positions of the valve 23, and to move the spool 40 from one operated position to another, it is necessary to overcome the bias of spring 71. The movement of the spool 40 of the valve 23 is controlled by a lever 41 which is journaled about shaft 42, as can be seen in Figure 7. The lever 41 is formed of a material such as spring steel, and is biased toward the side wall 14 on the right side of the tractor 10. The shaft 42 is in turn journaled through a bushing 43 which is secured to and through the right side wall 14 of the tractor 10, as can be seen in Figure 7. A link 44 is pivotally mounted at one end thereof to the lever 41 intermediate the ends thereof by pivotal mounting means 45. The other end of the link 44 is pivotally mounted to the spool 40 of the valve 23 through pivotal mounting means 46. The valve 23 including the spool 40, and the related hydraulic supply members (not shown) are so constructed and arranged that when the lever 41 is pivoted to its maximum clockwise direction, as viewed in Figure 4, the hydraulic rams 37 are extended to pivot the bell cranks 35, to move the links 33, to pivot the bucket 4 to the dump position. When the lever 41 is pivoted to its maximum counterclockwise direction, as viewed in Figure 4, the valve 23 operates to cause the hydraulic rams 37 to contract to pivot the bell cranks 35, and move the links 33, to cause the bucket to be tipped rearwardly with respect to the boom 15 to the tipback or carrying position. When the lever 41 is pivoted from either the maximum clockwise direction or counterclockwise direction, as shown in Figure 4, to the intermediate position, that wherein the detent balls 70 are positioned within the middle set of detent slots, the valve 23 operates to cause the hydraulic rams 37 to be stopped and held in the position to which the hydraulic rams 37 have at that time been operated. A legend has been used in each of Figures 5, 6, 8 and 9 to indicate the direction in which the lever 41 is moved to produce a movement toward either the dump position or towards the carrying or tipback position.

Turning next to the means cooperating with the previously described linkage elements for providing automatic indexing of the bucket, reference is again made to the drawings. An arm 50 is secured to the bell cranks 35 as by welding and generally depends therefrom, as can be seen in Figure 4. The other end of the arm 50 is pivotally connected to one end of a link 51 by pivotal mounting means 52. The other end of the link 51 is pivotally connected to one end of an arm 53 by pivotal mounting means 54. The other end of the arm 53 is secured to the shaft 42 previously described as journaled in bushing 43. The arm 53 may be secured to the shaft 42 by any means such as welding and is positioned to generally upstand therefrom, as can be seen in Figures 4 and 7. Thus it may be seen that when the bell crank 35 is pivoted in a counterclockwise direction, as viewed in Figure 4, by a contraction of the hydraulic rams 37, the shaft 42 will be pivoted in a clockwise direction as viewed in Figure 4 by the arms 50 and 53 and the link 51, and an opposite rotation or a counterclockwise rotation of the shaft 42, as viewed in Figure 4, will take place when the bell crank 35 is pivoted in a clockwise direction. The only other element which is secured to the shaft 42 is arm 55. The lower end of arm 55 is secured to shaft 42 by the bolt 56, and the arm 55 is positioned within the operator's compartment 12 adjacent to lever 41 as can be seen in Figure 7. It can thus be seen that the arm 55 will follow any movement of arm 53. A quadrant 57 is provided for cooperation with the arm 55 and the lever 41. The quadrant 57 is journaled about shaft 42 similarly as lever 41 and is positioned within the operator's compartment 12 on the opposite side of the arm 55 from lever 41, as can be seen in Figure 7. The outer periphery of the quadrant 57 is provided with a horizontal flange portion having a detent slot 58 formed therein.

The detent slot 58 cooperates with the lever 41 so that when the detent slot 58 and the lever 41 are in alignment with each other, the bias of the lever 41 will cause the lever 41 to be projected within the detent slot 58, as shown in Figure 5. A guide 73 is mounted to channel member 31 to limit the mount by which the lever 41 may be moved away from quadrant 57. The upper end of the arm 55 is connected to the quadrant 57 through a spring loading assembly 59. The spring assembly 59 is provided for the purpose of loading or compounding the rotative motion of the quadrant 57 with respect to the arm 55 to achieve an optimum movement of the spool 40 of the valve 23 in a manner to be described below. The spring assembly 59, which may easily be seen in Figure 6, comprises a shaft 60 secured at one end thereof to the upper end of the arm 55, a pair of bushings 61 and 62 slidably mounted upon the shaft 60 between the arm 55 and a stop 63 mounted at the other end of the shaft 60, and a compressed coiled spring 64 mounted about the shaft 60 between the slidable bushings 61 and 62 thereby constantly urging the bushings 61 and 62 apart to the position shown in Figure 6. The quadrant 57 is provided with a pair of flanges 65 and 66 for specific cooperation with the spring assembly 59. The flanges 65 and 66 are formed to have openings therethrough and are positioned relative to the spring assembly 59 so that the shaft portion of bushing 61 is mounted through the opening in the flange 65 and the shaft portion of bushing 62 is mounted through the opening in the flange 66. The openings in the flanges 65 and 66 are of a size large enough to permit easy sliding of the shaft portions of the bushings 61 and 62 therein and small enough to prevent passage of the shoulder portions of the bushings 61 and 62 therethrough. Further, the opening in flange 66 will not permit stop 63 to pass therethrough, so that if the arm 55 is moved in a counterclockwise direction as viewed in Figure 6, relative to the quadrant 57, the shaft 60 will be moved to cause the stop 63 to move bushing 62 toward bushing 61, further compressing the coil spring 64 until stop 63 abuts flange 66. If the arm 55 is moved in a clockwise direction as viewed in Figure 6, the shaft 60 and the bushing 61 will be moved by the arm 55 to cause the bushing 61 to further compress the coil spring 64 toward bushing 62 until the arm 55 abuts against flange 65. Coil spring 64 is selected as one having sufficient force when mounted as described above, to project the bushings 61 and 62 against the flanges 65 and 66 and cause no movement of the quadrant 57 relative to the arm 55 when the lever 41 is not within detent slot 58, but one having insufficient force to prevent any movement of the arm 55 relative to the quadrant 57 when the lever 41 is within the detent slot 58. This latter requirement is determined by the tension of the coiled spring 71 carried by the valve spool 40 biasing the detent balls 70 within any of the detent notches in the valve body to index the valve spool 40 to any one of the predetermined positions established by the detent notches in the valve body. This construction of the spring assembly 59 insures a positive operation of the valve 23 including the spool 40. As the arm 55 is moved in either direction with the lever 41 riding on the projecting flange portion of the quadrant 57, the quadrant 57 will be moved through the interconnection of the spring assembly 59 to follow the movement of the arm 55 until the detent slot 58 is positioned in alignment with the lever 41. The lever 41 will then be projected into the detent slot 58 through the spring bias of the lever 41. The quadrant 57 will then stop and the arm 55 will begin a pivotal movement relative to the quadrant 57, and the coil spring 64 of the spring assembly 59 will begin to be compressed. When either the stop 63 or the arm 55, dependent upon the direction of pivoting of arm 55, meets one of the flanges 65 or 66, the quadrant 57 will again be moved or pivoted to in turn pivot the lever 41 to cause a movement of the valve spool 40 overcoming the holding effort of the coiled spring 71 and the detent balls 70. As the balls 70 are freed from the detent notches in the valve body 23, the force causing the compression of the coil spring 64 in the spring assembly 59 is gone, and the coil spring 64 will then quickly restore. As the coil spring 64 restores it will, in acting against the associated bushings 61 and 62 and the flanges 65 and 66, cause a rapid and positive movement of the quadrant 57. The lever 41, within the detent slot 58, will follow this movement to quickly and positively move the valve spool 40 to the next valve position, the intermediate or neutral position. The valve 23 including the valve spool 40, will then cause the hydraulic rams 37 to be stopped in that position wherein the linkage elements previously described index the bucket to the dig position.

In the operation of the present invention, assuming that the bucket 17 is in the dig position, the operator of the loader may tip the bucket 17 backward to the carrying position, by moving the lever 41 sideways against its bias out of the detent slot 58 and then rearwardly. The structures previously described will then operate to tilt the bucket 17 to the carrying position. The quadrant 57 will in turn be pivoted forwardly. If the lever 41 is maintained in the rearward position until the bucket is in the maximum tipback position, the quadrant 57 will assume a position such as shown in Figure 8. The operator may at any time move the lever 41 to the intermediate or neutral position to stop the bucket 17 at any degree of tip back. The operator may then move lever 25 rearwardly to cause the bucket 17 to be raised to any height. To then dump the bucket the operator moves the lever 41 forwardly to the dump position and holds the lever 41 to prevent its dropping into detent slot 58 as the quadrant 57 is tilted rearwardly to a position such as shown in Figure 9. The previously described mechanisms will then operate to tilt the bucket to the dump position. To then index the bucket 17 in the dig position for further digging operations, the operator of the loader moves the lever 41 to the rearward or tipback position and releases it. The hydraulic rams 37 will begin to contract pivoting the bell cranks 35 rearwardly to move the bucket 17 toward the tipback position. As previously described, when the bell cranks 35 are pivoted rearwardly, the quadrant 57 will be moved forwardly by the interconnecting linkage previously described from the position shown in Figure 9. When the quadrant 57 is moved to a position wherein the detent slot 58 is aligned with the lever 41, the lever 41 will be projected therewithin. The quadrant 57 will be stopped until arm 55 engages flange 55, when flange 65 will move quadrant 57 and lever 41 carried thereby, and the valve 23 will be operated to move the detent balls 70 from the rearward detent notches in the valve body. As previously described the coil spring 64 will then rapidly move the quadrant 57 and the lever 41 carried thereby to in turn snap the valve 23 into the intermediate or neutral position to stop the operation of the hydraulic rams 37 with the bucket indexed in the dig position. Meanwhile, the described boom operating mechanism of the loader may be operated to lower the bucket 17. Any other combination of operations of the bucket and the raising and lowering of the boom may be performed in a similar manner. It is believed sufficient to point out that whenever the operator of the loader desires to pivot the bucket relative to the boom to index the bucket in the dig position, it is merely necessary to operate the lever 41 in the direction in which the bucket must be moved to gain the dig position. Thus if the bucket 17 is in some position between maximum tip back and the dig position, the bucket 17 must be tilted forwardly to gain the dig position, and therefore the operator would move the lever 41 to the forward position. With the valve spool 40 positioned in the forward detent notches, the hydraulic rams 37 will tilt the bucket 17 forwardly, and movement of the quadrant 57 as previously described will then pick up the lever 41 at the proper position and move the lever 41 as previously described to index the bucket 17 in the dig position.

Having described the invention, what is considered new and desired to be protected by Letters Patent is:

1. In a power loader having a digging bucket pivotally carried by a boom, linkage means operable to tilt said bucket relative to said boom, hydraulic ram means connected to said linkage means and operable to operate said linkage means to tilt said bucket relative to said boom, hydraulic valve means for said hydraulic ram means including a manually operable lever carried on said loader, said hydraulic valve means operating responsive to the manual operation of said lever to three positions to control the operation of said hydraulic ram means to operate said linkage means to tilt said bucket relative to said boom to a carrying position, a dumping position and an intermediate digging position, a quadrant carried on said loader and mounted in cooperation with said lever, linkage elements mounted between said linkage means and said quadrant and operating responsive to the operation of said linkage means to move said quadrant, said quadrant formed to engage said lever in a position of movement of said quadrant substantially corresponding to the digging position of said bucket to operate said hydraulic valve means to cause said hydraulic ram means to operate said linkage means to position said bucket in said digging position.

2. In a power loader having a digging bucket pivotally carried by a boom, linkage means operable to tilt said bucket relative to said boom, hydraulic ram means connected to said linkage means and operable to operate said linkage means to tilt said bucket relative to said boom, hydraulic supply means for said hydraulic ram means including a spring biased three position hydraulic valve, a manually operable lever carried on said loader and connected to said hydraulic valve for operating said hydraulic valve to control the operation of said hydraulic ram means to operate said linkage means to tilt said bucket relative to said boom to a carrying position, a dumping position and an intermediate digging position, and spring loaded indexing means operating responsive to the operation of said linkage means from said carrying position and dumping position to overcome the spring bias of said hydraulic valve to operate said manually operable lever through the spring load of said indexing means to rapidly operate said hydraulic valve to index said bucket in said digging position.

3. In a power loader having a digging bucket pivotally carried by a boom, linkage means operable to tilt said bucket relative to said boom, hydraulic ram means connected to said linkage means and operable to operate said linkage means to tilt said bucket relative to said boom, hydraulic supply means for said hydraulic ram means including a spring biased multi-position hydraulic valve, a manually operable lever carried on said loader and connected to said hydraulic valve for operating said hydraulic valve to control the operation of said hydraulic ram means to operate said linkage means to tilt said bucket relative to said boom to a plurality of positions, a quadrant carried on said loader and mounted in cooperation with said lever, spring loaded linkage elements mounted between said linkage means and said quadrant and operating responsive to the operation of said linkage means to overcome the spring bias of said hydraulic valve through the spring load of said linkage elements to rapidly move said quadrant, said quadrant formed to engage said lever in a position of movement of said quadrant substantially corresponding to the digging position of said bucket to operate said hydraulic valve to cause said hydraulic ram means to operate said linkage means to index said bucket in said digging position.

4. In a power loader having a digging bucket pivotally carried by a boom, linkage means operable to tilt said bucket relative to said boom, hydraulic ram means connected to said linkage means and operable to operate said linkage means to tilt said bucket relative to said boom, hydraulic supply means for said hydraulic ram means including a three position hydraulic valve, said three position hydraulic valve having spring operated detent means biasing said valve in each of said three positions so that a substantially greater force is required to initially operate said valve from any of said three positions than is required to operate said valve between said three positions, a manually operable lever carried on said loader and connected to said hydraulic valve for operating said hydraulic valve to control the operation of said hydraulic ram means to operate said linkage means to tilt said bucket relative to said boom to a carrying position, a dumping position and an intermediate digging position, and spring loaded indexing means operating responsive to the operation of said linkage means from said carrying position and said dumping position to overcome said spring detent means of said hydraulic valve to operate said manually operable lever through the spring load of said indexing means to rapidly operate said hydraulic valve to index said bucket in said digging position.

5. In a power loader having a digging bucket pivotally carried by a boom, linkage means operable to tilt said bucket relative to said boom, hydraulic ram means connected to said linkage means and operable to operate said linkage means to tilt said bucket relative to said boom, hydraulic supply means for said hydraulic ram means including a three-position hydraulic valve, said three-position hydraulic valve having spring operated detent means biasing said valve in each of said three positions so that a substantially greater force is required to initially operate said valve from any of said three positions than is required to operate said valve between said three positions, a manually operable lever carried on said loader and connected to said hydraulic valve for operating said hydraulic valve to the two extreme positions of said three positions to control the operation of said hydraulic ram means to operate said linkage means to tilt said bucket relative to said boom to a carrying position and a dumping position, and for operating said hydraulic valve to the intermediate of said three positions to control the operation of said hydraulic ram means to operate said linkage means to hold said bucket relative to said boom in an intermediate digging position, a quadrant carried on said loader and mounted in cooperation with said lever, spring loaded linkage elements mounted between said linkage means and said quadrant and operating responsive to the operation of said linkage means to overcome the spring operated detent means biasing said valve in said two extreme positions of said three positions through the spring load of said linkage elements to rapidly move said quadrant, said quadrant formed to engage said lever in a position of movement of said quadrant substantially corresponding to a certain digging position of said bucket to operate said hydraulic valve to said intermediate position to cause said hydraulic ram means to operate said linkage means to index said bucket in said certain digging position.

References Cited in the file of this patent

FOREIGN PATENTS

| 146,887 | Australia | June 18, 1952 |
| 1,068,273 | France | Feb. 3, 1954 |